United States Patent Office 3,421,802
Patented Jan. 14, 1969

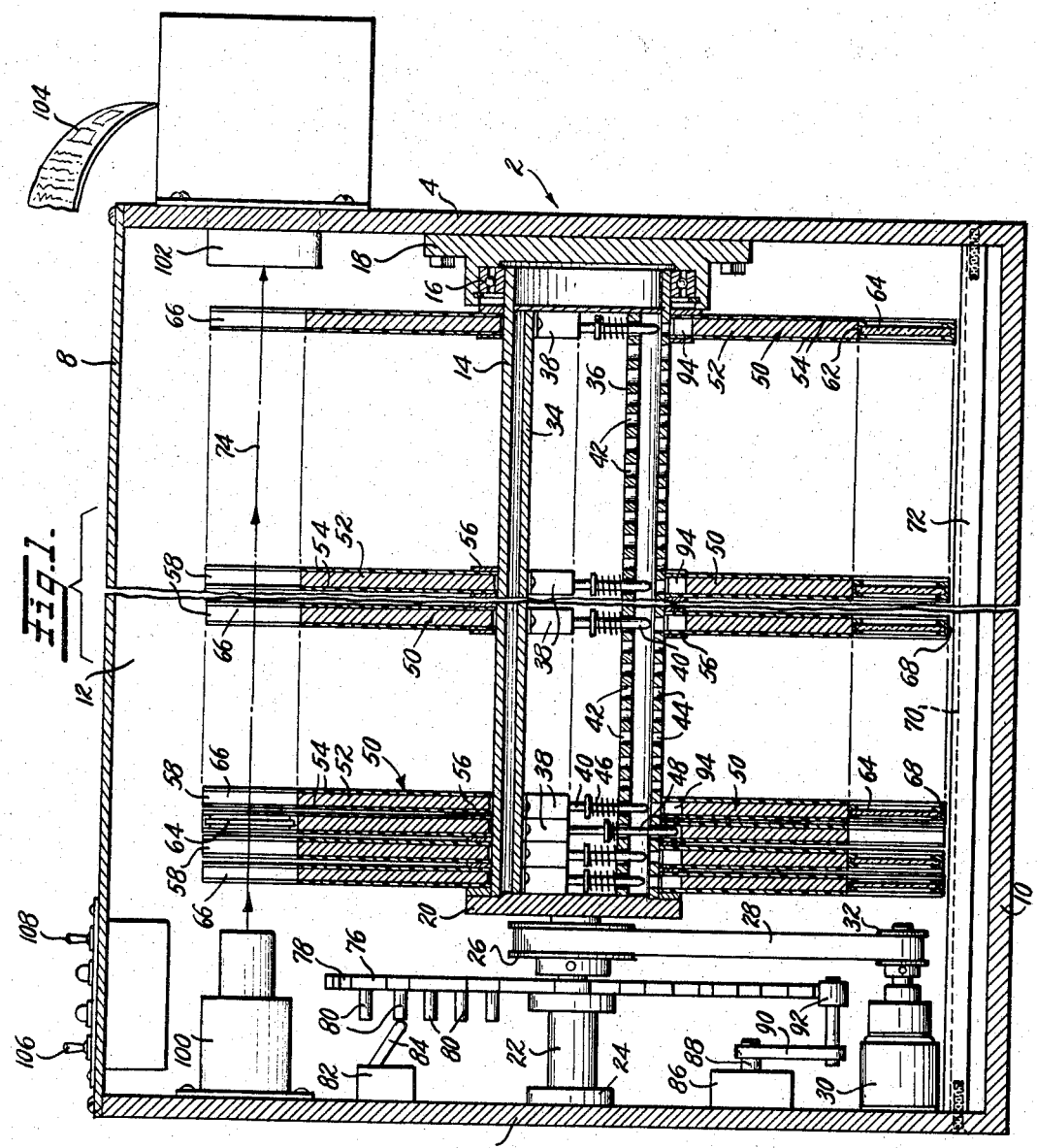

3,421,802
INSTANT RETRIEVAL OPTICAL STORAGE SYSTEM
Carlos A. Irazoqui, New York, N.Y., assignor to Ragen Precision Industries, Inc., a corporation of New Jersey
Filed July 6, 1967, Ser. No. 651,546
U.S. Cl. 312—183
Int. Cl. A47b 63/06; B42f 19/04
5 Claims

ABSTRACT OF THE DISCLOSURE

A plurality of supports each having a row of a plurality of transparencies thereon, the supports being movable in respective parallel planes to move their transparencies serially about a closed path intersecting a common projection path normal to the planes, the projection path being defined by aligned gaps in the rows of transparencies so that a selected transparency on any one of the supports can be moved into the projection path, means, such as a laser, at one end of the projection path for projecting collimated light therealong and through a transparency therein and to an image receiving device at the other end of the projection path.

Cross reference to related application

This application is directed to an invention having many features in common with the invention described in my copending application Ser. No. 651,545, filed July 6, 1967, for Random Access Storage and Retrieval System and is a different species of the same basic invention.

Background of the invention

This invention relates to apparatus for storing a plurality of transparencies, such as microfilm or the like, and for optically retrieving the information recorded thereon in a random manner without the necessity of following a preset sequence through the positions of a great number of other transparencies.

Customarily, microfilm or the like recordings of information on transparent media are recorded on lengths of film in separate frames and stored in the form of reels of such film. To retrieve the information recorded on any particular frame, it has been necessary to select the proper reel, then thread or mount the reel in a suitable projection or viewing apparatus in which the film is progressed until the selected frame is in position in the projection mechanism whereupon it can be viewed and/or reproduced. However, this system is time-consuming and requires equipment separate from the storage facilities and involves transport of the reels from storage to the viewer and return to storage after use.

Summary of the invention

The present invention comprises an apparatus for storing separate transparencies or chips of microfilm in a manner to render any selected chip retrievable for viewing in a minimum period of time. The apparatus comprises a plurality of supports each adapted to carry a multiplicity of the transparencies arranged in any selected line sequentially around a closed path in a plane parallel to the plane of movement of adjacent supports. The supports are moved until a selected individual transparency thereon is positioned in a projection path intersecting all of the closed paths of the various supports. The projection path is defined by notches or openings in the separate supports and resulting in a gap in each line of transparencies, which gaps are normally positioned in alignment to define the projection path. When a support has been moved to position a selected article in the projection path, a light source may be activated to project a beam of parallel rays of light along the path through the transparency and into an image-receiving device at the other end of the projection path. Thus, it is possible to store a great number of such transparencies in a limited space and any selected transparency can be moved into the projection path in a minimum amount of time, thus rendering retrieval of the information thereon extremely rapid.

Brief description of the drawings

FIG. 1 is a vertical sectional view through an apparatus embodying the principles of the invention; and
FIG. 2 is a fragmentary enlarged perspective view of a portion of FIG. 1.

Description of a preferred embodiment

Referring to the drawings, a cabinet 2 is provided with end walls 4 and 6, a top wall 8, a bottom wall 10, and side walls 12 (only one shown). Within the cabinet 2 a hollow tubular shaft 14 is journalled by having one end thereof mounted in a suitable bearing 16 carried by a bracket structure 18 secured to the end wall 4. The other end of the tubular shaft 14 is closed by a cap member 20 secured to one end of a shaft 22 which is journalled at its other end in a suitable bearing 24 mounted on the end wall 6. The cap 20 is secured to the tubular shaft 14 so that the assembly rotates as a unit. A pulley 26 is fixed to the shaft 22 and is driven by belt 28 which in turn is driven by a reversible motor 30, shown as mounted on the end wall 6 with its drive pulley 32 aligned with the pulley 26.

Within the hollow shaft 14 a pair of chordally extending plates 34 and 36 are fixedly mounted. The plate 34 has mounted thereon a plurality of solenoids 38 having armatures 40 in the form of clutch pins extending through corresponding openings 42 in the plate 36 and which openings are in turn aligned with corresponding openings 44 in the tubular shaft 14. Each armature 40 is spring-biased inwardly by a suitable spring 46 but is projected radially outwardly, as shown at 48, when its associated solenoid 38 is energized.

A plurality of separate discs 50 are rotatably mounted on the outer surface of the tubular shaft 14. As shown, by way of illustration, each disc 50 comprises a core portion 52 and surface plates 54. The adjacent discs 50 are axially separated by anti-friction spacers or washers 56 and, as stated, are each freely rotatable on the tubular shaft 14.

Referring now particularly to FIG. 2, each disc 50 is formed to define a plurality of spaced radially extending fingers 58. Adjacent fingers are provided with opposed grooves 60 receiving opposed edges of suitable frames 62 having microfilm chips 64, or other transparencies, mounted therein. The arrangement is such that a multiplicity of the transparencies are arranged around the periphery of each disc 50 continuously and in side-by-side relation except for a gap 66 between one pair of adjacent fingers 58. There is one gap on each of the discs 50 which contains no transparency and which is wider, in a peripheral direction, than the spaces between the remaining fingers 58. Thus, the gap 66 is wider than the transparencies, as is evident from FIG. 2.

Each of the discs further carries, at the end of one of its fingers 58, a spring pressed detent 68, which is normally spring urged outwardly but is provided with a rounded or tapered outer end. The spring detents are so positioned on each disc that they may engage within a groove 70 in a holding bar or member 72 extending axially adjacent the peripheries of the discs and being supported at its opposite ends on the end walls 4 and 6. The holding bar or member 72 is so positioned in the cabinet 2 that when a spring detent 68 engages in the groove 70, the gap or wide notch 66 of that disc is aligned with the corresponding wide notches of all other discs 50 having their detents 68 engaging in the groove 70. This is the normal position of all of the discs 50 and in which their wide notches or gaps 66 define a clear optical path extending axially of the apparatus, and identified by arrow 74 in the drawings. The optical path referred to will be hereinafter termed a projection path. The spring detents 68, groove 70, and bar 72 may be identical to corresponding elements shown in more detail in my prior application Ser. No. 651,545.

Also fixed to the shaft 22 is an indexing disc 76 having notches 78 in its periphery. There is a notch 78 for each of the transparencies carried by any disc 50. It is contemplated that each disc carry the same number of transparencies so that any selected notch 78 on disc 76 represents the peripheral address of a particular transparency on a selected disc 50. The disc 76 also carries a plurality of pins or signal devices 80, there being one such pin corresponding to each notch 78. Fixed on the end wall 6 is a detector device 82 having a sensing finger 84 extending into the path of travel of the pins 80, for a purpose to be described later. An indexing mechanism 86 is also fixed to the end wall 6 and is provided with a shaft 88 having a crank arm 90 thereon and on which an indexing roller 92 is journalled. Thus oscillation of shaft 88 will project the indexing roller 92 toward or from the notches 78 on indexing disc 76. The mechanism 86 may be solenoid operated or operated in any other suitable manner.

Control circuits for the apparatus are not shown herein since many different circuits may be employed, suitable circuits being obvious to those skilled in the art. The invention resides in the structural arrangement so far described and to be described and not in any particular control circuitry or specific sequence of operation of the parts. However, it is contemplated that the device may be programmed and under the control of computers, memory devices for storing the addresses of sequentially selected transparencies or the like, on the other hand it may be sequentially cycled by magnetic tape, punch cards or even manually. The manner of use and a preferred sequence of operations will be briefly described.

At the start of any cycle of operation all discs are in a starting or "home" position wherein their detents 68 engage groove 70 and all solenoids 38 are deenergized. Likewise, motor 30 is stopped and roller 92 is held retracted from the indexing disc 76. Let us now assume that the operator desires to retrieve the information from a particular transparency mounted on one of the discs 50. By manipulation of suitable pushbuttons or otherwise, or in response to a preset program, one of the pins 80 on disc 76 will be conditioned in an electrical circuit (not shown), a selected solenoid 38 will be energized, and motor 30 will be started. The conditioning of a selected pin 88 conditions a stopping and indexing circuit which may be of a type that will be obvious to those skilled in the art. Energization of the selected solenoid 38 will project its clutch pin 48 outwardly to pass through an aligned opening 44 in shaft 14 and enter a socket 94 in the corresponding disc 50 to thus clutch only that selected disc to the shaft 14. It is contemplated that suitable logic circuitry be provided so that rotation of the motor 30 will be in a direction to move the selected transparency into the projection path 74, with the least possible amount of rotary movement. Such logic circuits are well known and need not be described. However, the motor 30 will rotate the shaft 14 and the selected disc 50 until the selected transparency is positioned in the projection path previously described. A transparency so positioned is shown at 64 in FIG. 2. When the transparency reaches such position, the conditioned pin 80 will be engaged by sensing finger 84 and this will deenergize motor 30 to stop the same and at the same time will oscillate the shaft 88 to project indexing roller 92 into an adjacent notch 78 to thus hold the selected disc 50 with the selected transparency in the projection path. It is to be noted that none of the other discs will rotate during the function just described since their spring detents 68 hold them against rotation. However, when a selected disc is clutched to the shaft 14, the torque applied by motor 30 is sufficient to forcibly cam the corresponding detent 68 out of the groove 70.

Secured to the end wall 6, in a position in alignment with one end of the projection path 74, is a light source 100 capable of producing parallel rays of light and projecting the same along the projection path. Such a source may be an optical laser, which is a well known source of coherent light rays, or it may be any suitable light collimating apparatus. The light rays projected along the path 74 by the device 100 pass through the transparency 64 positioned in that path and carry the image recorded thereon along the path 74 to an image receiver 102 at the other end of the projection path. The image receiver 102 may be of any desired form or nature, such as a device for focusing the image onto a film and recording the same thereon, such as the film shown at 104, whereby a copy of the transparency 64 may be produced. On the other hand, the device 102 may function to enlarge the received image and project the same on a screen for direct viewing or otherwise.

After the apparatus has been cycled, as previously described, to position a selected transparency in the projection path, the parts are brought to a stop and held in their new position whereupon the operator may actuate a suitable switch, suggested at 106, to energize the light source 100 whereupon the desired image is projected into the receiver 102. After the image has been utilized in whatever manner selected, the operator may actuate a switch 108 to start a second part of a complete cycle of operation. During the projection portion of the cycle the clutch pin 48 of the selected disc is left in the projected position as shown in FIG. 2 by keeping its corresponding solenoid 38 energized. Upon actuation of the switch 108, the indexing roller 92 is withdrawn and a "home" pin 80 is conditioned. That particular pin corresponds to the wide notch 66. At the same time motor 30 is energized to rotate in a direction the reverse of that in which it previously rotated. Thus, the disc 50 that was previously actuated is returned to its original position with its wide notch 66 again aligned with the remaining notches and at which time the "home" pin 80 is effective through sensing finger 84 to stop the motor 30 and deenergize the previously actuated solenoid 38. At this time the detent 68 of the selected disc 50 has again engaged in groove 70 and all functions of the apparatus are brought to a standstill and the device is ready for a subsequent cycle of operation. Actuation of the switch 108 to initiate the just-described second portion of the cycle will also preferably deenergize the light source 100 and image receiver 102.

While a single specific embodiment of the invention is shown herein, it is merely illustrative of the principles involved and other embodiments may be resorted to within the scope of the appended claims.

I claim:
1. A microfilm storage and optical retrieval apparatus comprising: a plurality of article supports having separate holding means thereon for holding image-bearing transparencies, said supports being independently movable in respectively adjacent parallel planes and arranged to move their respective transparencies around a closed path; said holding means being serially arranged along said path with a gap between two of said holding means, said gap being at least as wide in the direction of said closed path as the corresponding dimension of any of said transparencies; latch means for releasably holding all said supports with their respective gaps in alignment to define a projection path; means for moving a selected one of said supports to position a selected transparency thereon in said projection path; means at one end of said projection path for projecting a beam of collimated light therealong and through said selected transparency; and means at the other end of said projection path for receiving an image of said transparency.

2. Apparatus as defined in claim 1 wherein said supports comprises a plurality of discs rotatable about a common axis, said holding means being arranged around and adjacent the peripheries of said discs and said gaps being defined by a notch in the periphery of each disc.

3. Apparatus as defined in claim 2 wherein said latch means comprise a spring actuated detent on each disc and a stationary detent-engaging means adjacent the periphery of each disc.

4. Apparatus as defined in claim 1 including releasable indexing means for holding said selected support with the holding means for said selected transparency accurately aligned with said projection path.

5. Apparatus as defined in claim 2 including a hollow shaft defining said common axis, said discs being separately journalled about said shaft, means for rotating said shaft; and selectively operable means for clutching said selected support to said shaft for rotation therewith.

References Cited

UNITED STATES PATENTS

| | | | |
|---|---|---|---|
| 2,989,904 | 6/1961 | Braggs et al. | 95—4.5 |
| 3,198,068 | 8/1965 | Horst et al. | 88—27 X |
| 3,225,770 | 12/1965 | Laskey et al. | 129—16.1 |

CASMIR A. NUNBERG, *Primary Examiner.*

U.S. Cl. X.R.

88—24; 214—16.4; 312—234.1